UNITED STATES PATENT OFFICE.

WILLIAM V. WATSON, OF SAN DIEGO, CALIFORNIA, ASSIGNOR OF ONE-HALF TO SAN DIEGO CONSOLIDATED GAS AND ELECTRIC COMPANY, OF SAN DIEGO, CALIFORNIA, A CORPORATION OF CALIFORNIA.

COMPOSITION AND PROCESS FOR PRESERVING WOOD AND METALS.

1,404,501.      Specification of Letters Patent.    Patented Jan. 24, 1922.

No Drawing.     Application filed May 27, 1920. Serial No. 384,593.

*To all whom it may concern:*

Be it known that I, WILLIAM V. WATSON, a citizen of the United States, residing at San Diego, in the county of San Diego and State of California, have invented a certain new and useful Composition and Process for Preserving Wood and Metals, of which the following is a specification.

My invention relates to a composition and method for preserving wood and metals against the action of borers more particularly the preservation of piling against the various marine borers; posts, ties, pipes and other woods and metals in contact with the earth against fungus growth and insect life and the objects of my invention are: first, to provide a composition and method of impregnating and covering the surface with a pliable poisonous matter which will prevent fungus growth and insect life from destroying the matter thus prepared; second, to provide a composition for such purposes which is composed principally of refuse and by-products of very little value otherwise; third, to provide a composition and process of this class which is very durable and will not become brittle and break and is not subject to early decay; and fourth, to provide a composition and process of this class which is very easily and economically compounded and applied.

With these and other objects in view as will appear hereinafter my invention consists of a certain novel process of compounding and applying and a certain novel composition used as a preservative for woods and metals of various kinds and classes as will be hereinafter described in detail and particularly set forth in the appended claims.

My invention consists principally in preparing a composition which is composed principally of worthless refuse from gas plant purifiers by transferring the antiseptic and poisonous ingredients from said refuse into a solvent chemical paint for painting the outer surface of piling, posts, under ground pipe and the like for preservation and protection against the varying class of wood borers, vermin, acid and alkaline condition of soil and the like that cause early decay of wood and metals.

The refuse from gas plant purifiers consists of a sponge which is made as follows: By taking wood shavings and adding sulphate of iron, slacked lime and oxidized iron filings and turnings to form iron oxide by weathering, which absorbs and collects all the poisonous, tarry oils, and sulphur from the sulphuretted hydrogen, naphthalene and other antiseptic and poisonous combinations in crude burning gas.

This refuse discarded from the purifiers of gas plants contains approximately 40 to 60% of sulphur as sulphide, 5% of naphthalene and varying quantities of tar containing ammoniacal liquor. and naphtha, carbolic oil, creosote oil, anthracene, pitch and asphalt, also traces of poisonous Prussian blue and cyanide combinations.

This discarded worthless sponge mass is thoroughly mixed with an equal part of hot tar or asphaltum, preferably the asphaltum known as "petrolactic cement." An equal part of gasoline is added and the mass thoroughly agitated, stirred and heated. When the mixture assumes the proper consistency, it is poured off from the wood shavings and is ready for use. It will be here noted however that these wood shavings may be retained in some cases and help form the body of the composition.

This composition is applied as follows: It is applied to the surface of the piling either before or after being put in place, in hot or cold form in any manner, preferably by the use of a brush and it forms a solid non-brittle antiseptic and poisonous magma that marine, earth, wood and metal borers will not penetrate and chemical action of salt water, waves, and floating debris will not affect so as to destroy or break it off. The composition continues in slightly pliable form but not enough to run off during warm summer weather.

This composition can be applied to old and partially decayed piles, posts and the like by removing the outer surface, then painting said surface with the composition, a portion of which will be absorbed into the porous wood or metal for destroying the borers or fungus therein and prevents further attack from them.

Having thus described my invention what I claim as new and desire to secure by Letters Patent is:

1. The herein described method of preserving wood and metals consisting in painting the exposed surface with a composition consisting of the worthless sponge purifier from gas plants thoroughly mixed with an equal part of volatile solvent fluid to effect transfer of the poisonous solvent antiseptic chemical ingredients of the sponge to said wood and metals.

2. The herein described method of preserving wood and metals consisting in painting the exposed surface with a composition consisting of the worthless sponge purifier from gas plants thoroughly mixed, while heated to a suitable temperature, with an equal part of volatile solvent fluid to effect transfer of the poisonous solvent antiseptic chemical ingredients of the sponge to said wood and metals.

3. The herein described method of preserving wood, metals, or other substances, consisting in adding tarry substance to refuse purifier sponge from gas plants, then adding a volatile solvent fluid, then heating the mass, then agitating the mass until it becomes a sponge mass, then covering the surface of the wood with said mass.

4. The herein described method of preserving wood, consisting in utilizing the refuse discarded sponge from gas purifiers which consists substantially of 50% sulphur as sulphide, 5% naphthalene, various quantities of tar containing ammoniacal liquor and naphtha, carbolic oil, creosote oil, anthracene, pitch and asphalt, poisonous Prussian blue and cyanide and thoroughly mixing the same with tarry substance, then adding a volatile solvent fluid, then heating the mass, then impregnating and coating the wood with said mass.

5. The herein described method of preserving wood and metals consisting in subjecting the wood and metal to the penetrating and coating action of a solution, consisting of a mixture from refuse discarded gas purifier sponge, additional tar and volatile solvent fluid substantially as described.

6. A composition for preserving wood and metals consisting of refuse sponge from gas purifiers containing the usual antiseptic ingredients of said refuse, additional tar and a portion of volatile solvent fluid substantially as described.

7. A composition for preserving wood and metals consisting of refuse sponge from gas purifiers consisting substantially of 50% of sulphur as sulphide, 5% naphthalene and varying quantities of tar containing ammoniacal liquor, naphtha, carbolic oil, creosote oil, anthracene, pitch, and asphalt and a sufficient quantity of volatile solvent fluid to effect a liquid composition.

In testimony whereof, I have hereunto set my hand at San Diego, California, this 22 day of May, 1920.

WILLIAM V. WATSON.